(12) United States Patent
Fu

(10) Patent No.: US 12,079,274 B2
(45) Date of Patent: Sep. 3, 2024

(54) SYSTEMS AND METHODS FOR IDENTIFYING SCENE CHANGES IN VIDEO FILES

(71) Applicant: NBCUniversal Media LLC, New York, NY (US)

(72) Inventor: Qiang Fu, Sunnyvale, CA (US)

(73) Assignee: NBCUniversal Studios LLC, New York, NY (US)

( * ) Notice: Subject to any disclaimer, the term of this patent is extended or adjusted under 35 U.S.C. 154(b) by 425 days.

(21) Appl. No.: 16/162,212

(22) Filed: Oct. 16, 2018

(65) Prior Publication Data

US 2020/0118593 A1     Apr. 16, 2020

(51) Int. Cl.

| | |
|---|---|
| G06F 16/783 | (2019.01) |
| G06F 16/74 | (2019.01) |
| G06V 10/46 | (2022.01) |
| G06V 20/40 | (2022.01) |
| G11B 27/036 | (2006.01) |
| H04N 5/278 | (2006.01) |

(52) U.S. Cl.
CPC ........ *G06F 16/7847* (2019.01); *G06F 16/745* (2019.01); *G06V 10/462* (2022.01); *G06V 20/41* (2022.01); *G06V 20/46* (2022.01); *G06V 20/48* (2022.01); *G06V 20/49* (2022.01); *G11B 27/036* (2013.01); *H04N 5/278* (2013.01)

(58) Field of Classification Search
CPC . G11B 27/036; G06F 16/745; G06F 16/7847; G06K 9/00758; G06K 9/4671; G06K 9/6202; G06K 9/00744; G06K 9/00718; H04N 5/278

USPC ......................................................... 386/241
See application file for complete search history.

(56) References Cited

U.S. PATENT DOCUMENTS

| | | | |
|---|---|---|---|
| 8,762,564 B1* | 6/2014 | Philpott ........... | H04N 21/64322 709/219 |
| 2002/0044760 A1* | 4/2002 | Shirakawa ......... | G11B 20/1217 386/328 |
| 2004/0008284 A1 | 1/2004 | Kim | |
| 2004/0093220 A1* | 5/2004 | Kirby ..................... | H04N 5/278 704/278 |

(Continued)

OTHER PUBLICATIONS

Ardebilian Fard et al. ; "Improvement of shot detection methods based on dynamic threshold selection" Oct. 1997; pp. 14-21 (Year: 1997).*

*Primary Examiner* — Helen Shibru
(74) *Attorney, Agent, or Firm* — Fletcher Yoder, P.C.

(57) ABSTRACT

Systems and methods including one or more processing modules and one or more non-transitory storage modules storing computing instructions configured to run on the one or more processing modules and perform acts of: receiving at least two consecutive frames of a video file; determining a level of difference between the at least two consecutive frames of the video file; receiving a subtitle file associated with the video file; analyzing the subtitle file to identify a gap in conversation in the video file; and identifying a scene change in the video file when: (1) the level of difference between the at least two consecutive frames of the video file is above a predefined threshold; and (2) the level of difference between the at least two consecutive frames of the video file occurs during the gap in the conversation. Other embodiments are disclosed herein.

15 Claims, 10 Drawing Sheets

(56) References Cited

U.S. PATENT DOCUMENTS

| | | | | |
|---|---|---|---|---|
| 2004/0184785 | A1* | 9/2004 | Steyer | H04N 5/76 |
| | | | | 386/201 |
| 2007/0172199 | A1* | 7/2007 | Kobayashi | G11B 27/034 |
| | | | | 386/241 |
| 2008/0183541 | A1* | 7/2008 | Wenger | G06Q 30/02 |
| | | | | 705/14.61 |
| 2013/0113999 | A1* | 5/2013 | Vashistha | G06K 9/00765 |
| | | | | 348/702 |
| 2014/0119666 | A1* | 5/2014 | Ramaswamy | G06K 9/00711 |
| | | | | 382/206 |
| 2014/0254688 | A1* | 9/2014 | Tian | G06F 3/1462 |
| | | | | 375/240.25 |

* cited by examiner

400

| 401 – Receiving at least two consecutive frames of a video file |

| 402 – Determining a level of difference between the at least two consecutive frames of the video file |

| 403 – Receiving a subtitle file associated with the video file |

| 404 – Analyzing the subtitle file to identify gaps in conversation in the video file |

| 405 – Identifying a scene change in the video file |

| 406 – Inserting a media file when the scene change occurs |

SYSTEMS AND METHODS FOR IDENTIFYING SCENE CHANGES IN VIDEO FILES

TECHNICAL FIELD

This disclosure relates generally to communications technology, and more particularly relates to image analysis applications, pattern recognition, and enhancement and transformation in video files.

BACKGROUND

Modern video technology poses many problems for traditional video editing techniques. In the past, scene changes have been identified qualitatively by humans watching videos or reviewing frames of reel-to-reel tape. These techniques, though, required large amounts of time and a dedicated technician to perform scene detection for each video that needed to be analyzed. Further, techniques for inserting other types of media into a video were limited to using a razor blade and adhesive to physically join frames on a reel-to-reel tape. Even as video storage technology has transferred from reel-to-reel tape to digital storage mediums, additional problems have been presented. More modern techniques that use complex algorithms suffer from problems related to overburdened processors and long runtime for analyses of large video files. Therefore, there is a desire for automated scene identification computer systems that have reduced processing burdens while still remaining automated on computer systems.

BRIEF DESCRIPTION OF THE DRAWINGS

To facilitate further description of the embodiments, the following drawings are provided in which:

FIG. 4 is a flowchart for a method, according to certain embodiments;

Figure 1:
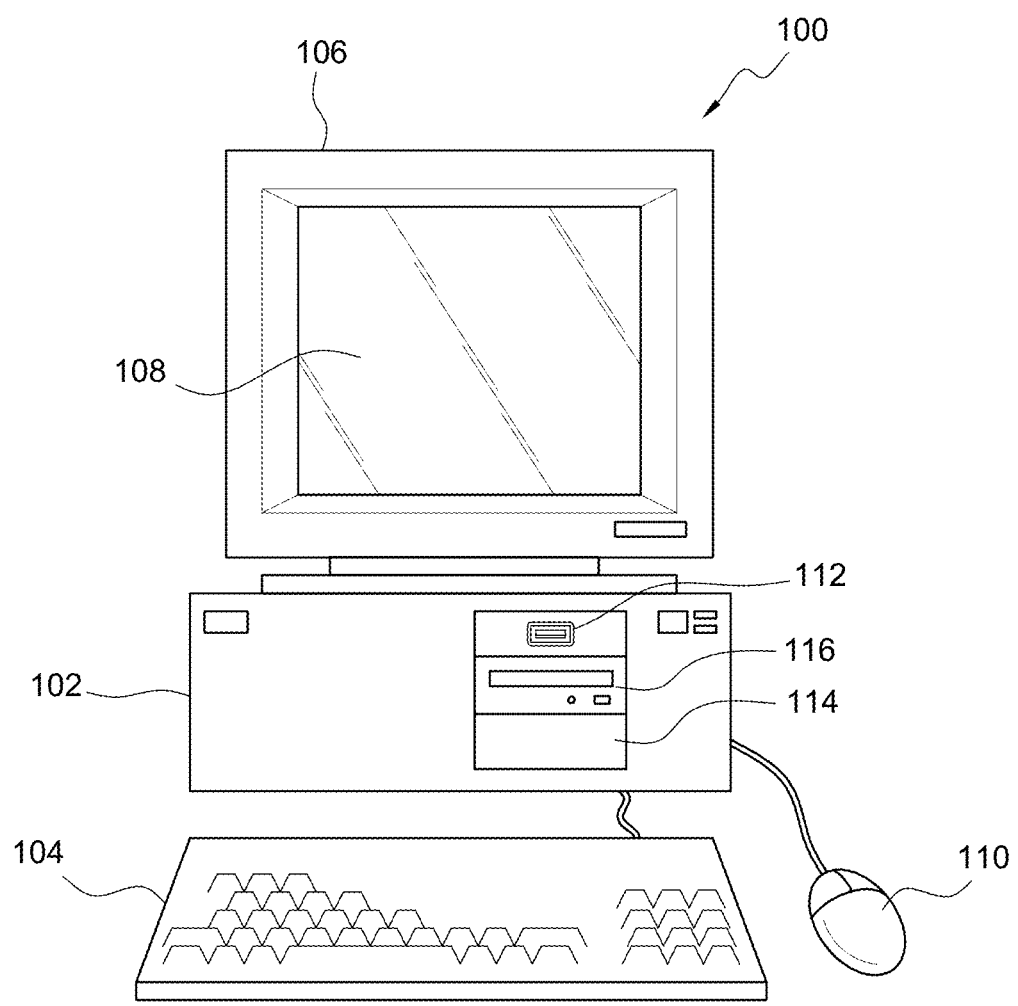
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform acts of: receiving at least two consecutive frames of a video file; determining a level of difference between the at least two consecutive frames of the video file; receiving a subtitle file associated with the video file; analyzing the subtitle file to identify a gap in conversation in the video file; and identifying a scene change in the video file when: (1) the level of difference between the at least two consecutive frames of the video file is above a predefined threshold; and (2) the level of difference between the at least two consecutive frames of the video file occurs during the gap in the conversation.

Various embodiments include a method. The method can include receiving at least two consecutive frames of a video file; determining a level of difference between the at least two consecutive frames of the video file; receiving a subtitle file associated with the video file; analyzing the subtitle file to identify a gap in conversation in the video file; and identifying a scene change in the video file when: (1) the level of difference between the at least two consecutive frames of the video file is above a predefined threshold; and (2) the level of difference between the at least two consecutive frames of the video file occurs during the gap in the conversation.

Figure 2:
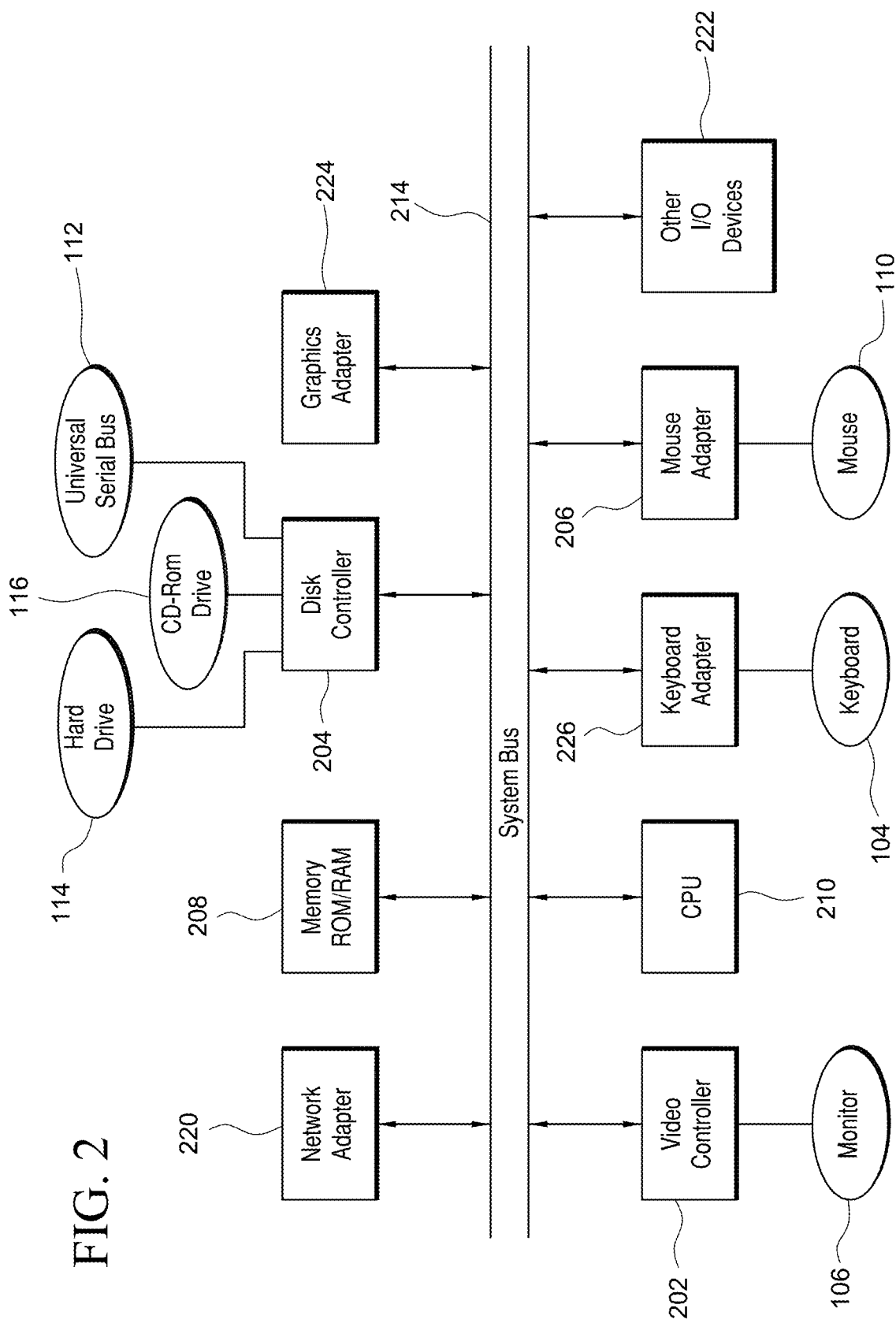
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smart-phone. In certain additional embodiments, computer system 100 may comprise an embedded system.

Figure 3:
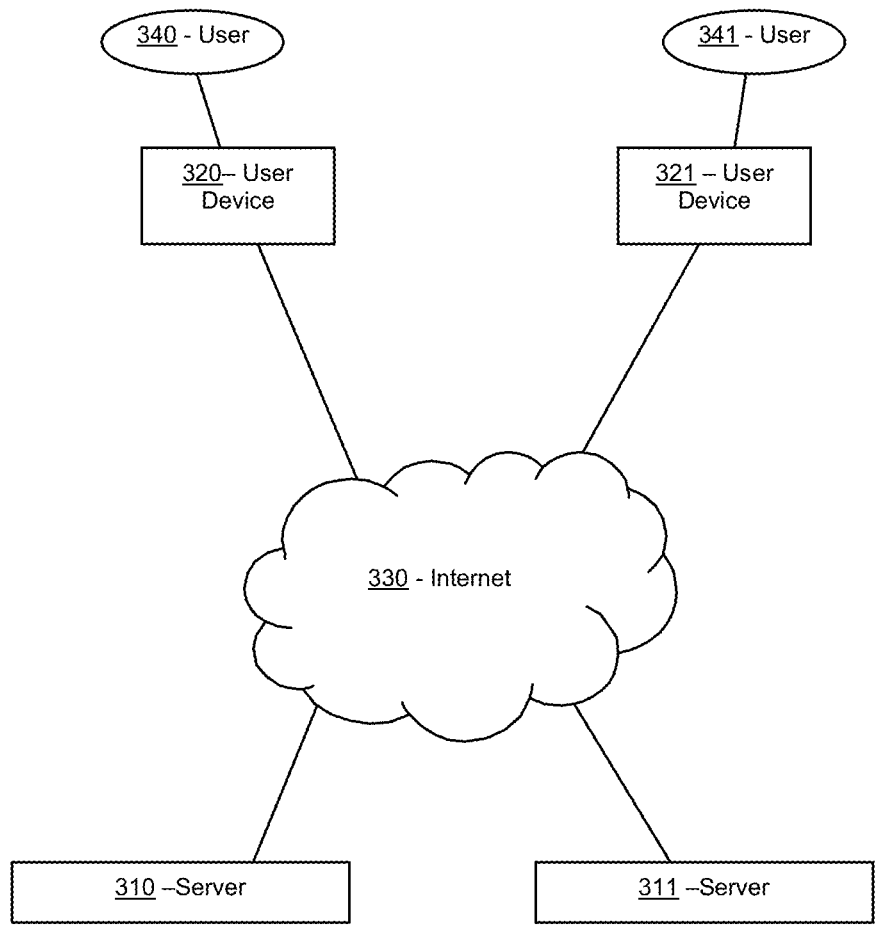
FIG. 3 illustrates a representative block diagram of a system, according to an embodiment.

Turning ahead in the drawings, FIG. 3 illustrates a block diagram of a system 300 that can be employed for identifying scene changes, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include servers 310, 311, user devices 320, 321 operated by users 340, 341, and an internet 330. Servers 310, 311, user devices 320, 321, and internet 340 can each be a computer system, such as computer system 100 (FIG. 1), as described above, and can each be a single computer, a single server, or a cluster or collection of computers or servers, or a cloud of computers or servers. In another embodiment, a single computer system can host each of and/or two or more of servers 310, 311, user devices 320, 321, and internet 340. Additional details regarding servers 310, 311, user devices 320, 321, and internet 340 are described herein.

User devices 320, 321 can comprise any of the elements described in relation to computer system 100. In some embodiments, user devices 320, 321 can be mobile devices and/or mobile electronic devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on a user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of a user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In some embodiments, servers 310, 311 can be in data communication through Internet 330 with user devices (e.g., 320, 321) and/or each other. In certain embodiments, user devices 320, 321 can be desktop computers, laptop computers, smart phones, tablet devices, and/or other endpoint devices. Servers 310, 311 can host one or more websites. For example, servers 310. 311 can host an eCommerce web site that allows users to browse and/or search for products, to add products to an electronic shopping cart, and/or to purchase products, in addition to other suitable activities.

In many embodiments, servers 310, 311 and user devices 320, 321 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of servers 310, 311 and/or user devices 320, 321 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of servers 310, 311 and/or user devices 320, 321. In a similar manner, the processing module(s) and the memory storage module(s) can be local and/or remote to each other.

In many embodiments, servers 310, 311 can be configured to communicate with one or more user devices 320, 321. In some embodiments, user devices 320, 321 also can be referred to as customer computers. In some embodiments, servers 310, 311 can communicate or interface (e.g., interact) with one or more customer computers (such as user devices 320, 321) through a network or internet 330. Internet 330 can be an intranet that is not open to the public. Accordingly, in many embodiments, servers 310, 311 (and/or the software used by such systems) can refer to a back end of system 300 operated by an operator and/or administrator of system 300, and user devices 320, 321 (and/or the software used by such systems) can refer to a front end of system 300 used by one or more users 350 and 351, respectively. In some embodiments, users 340 and 341 also can be referred to as customers, in which case, user devices 320, 321 can be referred to as customer devices. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, servers 310, 311 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between servers 310, 311 and/or user devices 320, 321, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

As stated above, prior methods of determining scene changes suffer from problems associated with long runtimes and increased burdens on processors performing the analyses. In many embodiments, the techniques described herein can provide several technological improvements. Specifically, the techniques described herein provide for the ability to determine when a scene change occurs. This approach is different from previous approaches, which applied subjective, human, manual determinations of scene changes. Further, by performing analysis on subtitle start and stop information instead of performing natural language processing or machine vision analysis of entire videos, processing burdens on a processor can be reduced and processing times can be improved.

In a number of embodiments, the disclosed systems and/or methods can provide several technological improvements. For example, the techniques described herein can be different from previous approaches, which did not consider using subtitle information to determine when a scene change occurs, and thus, would waste precious processing and storage resources performing complex machine vision calculations. In several embodiments, the disclosed systems and/or methods can further improve its accuracy by performing both subtitle analysis and machine vision analysis to determine when a scene change occurs, which can also provide for improved storage and reduced computer processing times over previous approaches.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as servers 310, 311 and/or user devices 320, 321 (FIG. 3). The processing module(s) can be similar or identical to the processing module(s) described above with respect to computer system 100 (FIG. 1).

In many embodiments, method 400 can comprise an activity 401 of receiving at least two consecutive frames of a video file. In some embodiments, consecutive frames can be immediately before and/or after each other with no intervening frames. In various embodiments, consecutive frames can have intervening frames in between them. In the same or different embodiments, a video file can comprise a digital video file, such as a WebM file (.webm), a Matroska file (.mkv), a Flash Video file (.flv), a F4V file (fly), a Vob file (.vob). an Ogg Video file, (.ogv and/or .ogg), a Dirac file (.drc), a GIF file (.gif), a Video alternative to GIF file (.gifv), a Multiple-image Networks Graphics file (.mng), an AVI file (.avi), an MPEG Transport Stream file (.MTS and/or .M2TS), a QuickTime File Format file (.mov and/or .qt), a Windows Media Video file (.wmv), a Raw Video Format file (.yuv), a RealMedia file (.rm), a RealMedia Variable Bitrate file (.rmvb), an Advanced Systems Format file (.asv), an AMV Video Format file (.amv), an MPEG-4 Part 14 file (.mp4, .m4p, and/or .m4v) a MPEG-1 file (.mpg, .mp2, .mpeg, .mpe, and/or .mpv), a MPEG-2 Video file (.mpg, .mpeg, and/or .m2v), an M4V file (.m4v), a SVI file (.svi), a 3GPP file (0.3gp), a 3GGP2 file (0.3g2), a Material Exchange Format (.mxf), a ROQ file (.roq), a Nullsoft Streaming Video file (.nsv), a Flash Video file (fly, .f4v, .f4p, .f4a, and/or .f4b), and/or any other suitable media file. A media file can also be transmitted or streamed to system 300 and/or between elements of system 300 using various streaming protocols such as dynamic adaptive streaming over HTTP (DASH), HTTP live streaming (HLS), or other streaming protocols known in the art. In various embodiments, a video file can further comprise an associated audio file and/or have audio information embedded into it. In the same or different embodiments, a video file can have no audio file, audio information, and/or sound.

In some embodiments, activity 401 can comprise using a distributed network comprising distributed memory architecture to receive at least two consecutive frames of a media file. This distributed architecture can reduce the impact on the network and system resources to reduce congestion in bottlenecks while still allowing data to be accessible from a central location.

In many embodiments, method 400 can comprise activity 402 of determining a level of difference between at least two consecutive frames of a video file. In some embodiments, a level of difference between at least two consecutive frames of a media file can be measured using a Scale-Invariant Feature Transform (SIFT) algorithm, a Rotation-Invariant Feature Transform (RIFT) algorithm, a Generalized Robust Invariant Feature (G-RIF) algorithm, a Speeded Up Robust Features (SURF) algorithm, a Principal Component Analysis Scale-Invariant Feature Transform (PCA-SIFT) algorithm, a Gradient Location and Orientation Histogram (GLOH) algorithm, Gauss-SIFT, Gauss-SURF, Binary Robust Independent Elementary Features algorithm (BRIEF), Oriented FAST and Rotated BRIEF (ORB), and/or other machine vision algorithms capable of determining a difference between two images or scenes.

Figure 10:
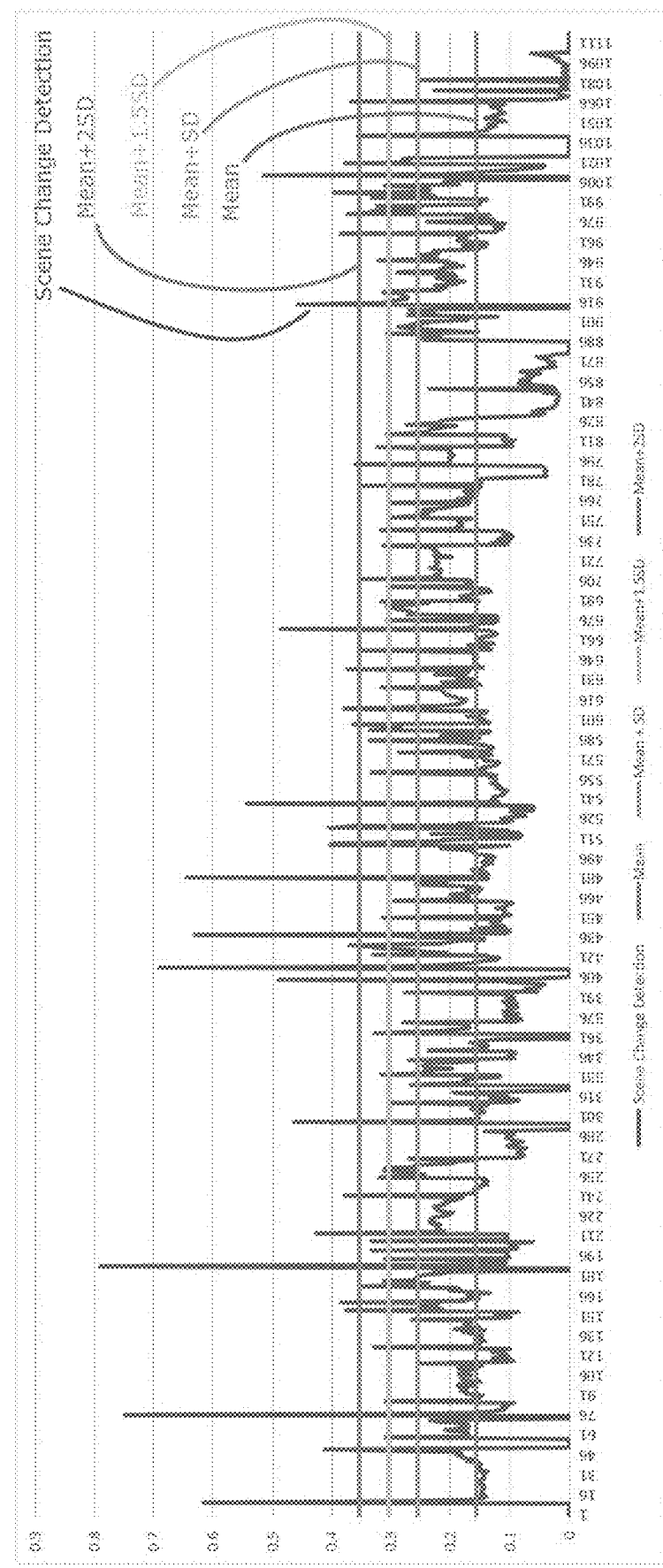
FIG. 10 illustrates a representative graphical representation, according to an embodiment.

In many embodiments, a level of difference between at least two consecutive frames of a media file can be measured relative to a predetermined threshold. In some embodiments, a predetermined threshold can be based upon a standard deviation. In the same or different embodiments, a standard deviation can be based on a whole video output of an algorithm used to determine a level of difference between at least two consecutive frames of a video file. In other words, differences between consecutive frames of a media file can be measured for the entire or a portion of the media file, and standard deviations can be determined based on these differences. In many embodiments, a predetermined threshold can comprise one standard deviation, two standard deviations, three standard deviations etc. In the same or different embodiments, a predetermined threshold can be the mean, median, or mode of the output of an algorithm used to determine a level of difference between at least two consecutive frames of a video file. In many embodiments, a predetermined threshold can comprise an arbitrary number determined by an administrator. In various embodiments, a predetermined threshold for a level of difference can be set by an administrator. A graphical representation of this concept is shown in FIG. 10.

Returning now to FIG. 4, in some embodiments, a level of difference between at least two consecutive frames of a video can be determined for a standard definition version of a video file, and a media file can be inserted into a high definition version of the video file as described in activity 406. In some embodiments, activity 402 can comprise using a distributed network comprising distributed memory architecture to determine a level of difference between at least two consecutive frames of at least two consecutive frames of a video file. This distributed architecture can reduce the impact on the network and system resources to reduce congestion in bottlenecks while still allowing data to be accessible from a central location. In the same or different embodiments, activity 402 can further comprise all or a portion of method 600 (FIG. 6).

Figure 6:
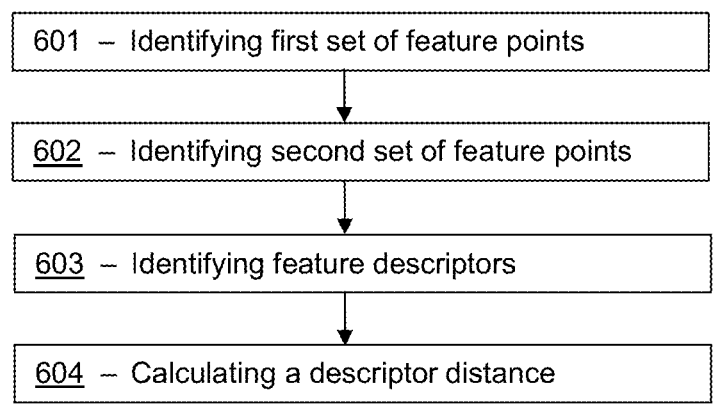
FIG. 6 illustrates a flowchart of a method, according to certain embodiments.

Turning ahead in the drawings, FIG. 6 illustrates a flow chart for a method 600, according to an embodiment. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. As stated above, in some embodiments, a portion or all of method 600 can be performed as a part of activity 402. In various embodiments, method 600 can be performed completely separate from activity 402. In many embodiments, system 300 (FIG. 3) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules. Such non-transitory memory storage modules can be part of a computer system such as servers 310, 311 and/or user devices 320, 321 (FIG. 3). The processing module(s) can be similar or identical to the processing module(s) described above with respect to computer system 100 (FIG. 1).

In many embodiments, method 600 can comprise activity 601 of identifying a first set of feature points. A set of feature point can generally be described as a set of points in an image that identify an object of interest in the image. Good feature points can comprise points of high contrast in an image, which can in some embodiments be edges of an object of interest. In some embodiments, a first set of feature points can be identified using a Canny edge detector, a Deriche edge detector, the Sobel-Feldman operator, a Prewitt operator, a Roberts cross operator, a Harris Operator, a Shi and Tomasi algorithm, a Forstner corner detector, a multi-scale Harris operator, a level curve curvature approach, a Wang and Brady corner detection algorithm, a SUSAN corner detector, a Trajkovic and Hedley corner detector, and/or any other algorithm capable of identifying feature points. In some embodiments, activity 601 can comprise using a distributed network comprising distributed memory architecture to identify a first set of feature points. This distributed architecture can reduce the impact on the network and system resources to reduce congestion in bottlenecks while still allowing data to be accessible from a central location.

In many embodiments, method 600 can comprise activity 602 of identifying a second set of feature points. A set of feature point can generally be described as a set of points in an image that identify an object of interest in the image. Good feature points can comprise points of high contrast in an image, which can in some embodiments be edges of an object of interest. In some embodiments, a second set of feature points can be identified using a Canny edge detector, a Deriche edge detector, the Sobel-Feldman operator, a Prewitt operator, a Roberts cross operator, a Harris Operator, a Shi and Tomasi algorithm, a Forstner corner detector, a multi-scale Harris operator, a level curve curvature approach, a Wang and Brady corner detection algorithm, a SUSAN corner detector, a Trajkovic and Hedley corner detector, and/or any other algorithm capable of identifying feature points. In some embodiments, activity 602 can comprise using a distributed network comprising distributed memory architecture to identify a second set of feature points. This distributed architecture can reduce the impact on the network and system resources to reduce congestion in bottlenecks while still allowing data to be accessible from a central location.

In many embodiments, method 600 can comprise activity 603 of identifying a feature descriptor for each feature point in a set of feature points. A feature descriptor can generally be described as an n-dimensional vector corresponding to properties of a feature point and/or the local area surrounding a feature point. A feature descriptor in computer vision can be used to describe the region around a feature point, and is characterized by the position, orientation, and scale which is proportional to the diameter of the neighborhood of the feature point. In some embodiments, activity 603 can comprise using a distributed network comprising distributed memory architecture to identify feature descriptor for each feature point in a set of feature points. This distributed architecture can reduce the impact on the network and system resources to reduce congestion in bottlenecks while still allowing data to be accessible from a central location.

In many embodiments, method 600 can comprise activity 604 of calculating a descriptor distance for at least a pair of feature points. In some embodiments, a descriptor distance can comprise a distance between two feature points and/or feature descriptors in two consecutive frames of a video file. In the same or different embodiments, the two feature points and/or feature descriptors identify a same object of interest in two consecutive frames of a video file. In this way, an object of interest can be tracked as it moves in a video file. In the same or different embodiments, a descriptor distance can be measured relative to a predetermined threshold. In various embodiments, when a feature distance is above or below a predetermined threshold, a level of difference is also above or below a predetermined threshold, and a scene change can be detected. In some embodiments, a predetermined threshold for feature descriptors and/or descriptor distances can be determined using the same techniques as described for activity 402 (FIG. 4). In many embodiments, a predetermined threshold is set by an administrator. In some embodiments, activity 604 can comprise using a distributed network comprising distributed memory architecture to calculate a descriptor distance between two feature points and/or feature descriptors in two consecutive frames of a video file. This distributed architecture can reduce the impact on the network and system resources to reduce congestion in bottlenecks while still allowing data to be accessible from a central location.

Returning now to FIG. 4, in many embodiments, method 400 can comprise activity 403 of receiving a subtitle file associated with a video file. In various embodiments, a subtitle file can be a part of, embedded in, and/or appended to a video file, in which case activity 403 could be part of activity 401. In the same or different embodiments, a subtitle file can be wholly separate from a video file, in which case activity 403 could be separate from activity 401. In embodiments where a subtitle file is wholly separate from a video file, the subtitle file cam comprise an AQTitle file (.aqt), an EBU Timed Text document, a Gloss Subtitle file (.gsub), a JACO Sub file (.jss), a MicroDVD file (.sub), an MPEG-4 Timed Text file (.ttxt), an MP sub file (.sub), a Phoenix Subtitle file (.pjs), a PowerDivX file (.psb), a RealText file (.rt), a SAMI file (.smi), a Spruce Subtitle Format file (.st1), a Structured Subtitle Format file (.ssf), a SubRip file (.srt), a SubStation Alpha file (.ssa), and Advanced SubStation Alpha file (.ass), a SubViewer file (.sub), a Universal Subtitle Format file (.usf), a VobSub file (.sub and/or .idx), Synchronized Multimedia Integration Language (.smil), Timed Text Markup Language AKA Distribution Format Exchange Profile file (.ttml, .dfxp and/or .xml), Web Video Text Tracks (.vtt), and/or other subtitle file types known in the art. In some embodiments, activity 403 can comprise using a distributed network comprising distributed memory architecture to receive a subtitle file associated with a video file. This distributed architecture can reduce the impact on the network and system resources to reduce congestion in bottlenecks while still allowing data to be accessible from a central location.

In many embodiments, method 400 can comprise activity 404 of analyzing the subtitle file to identify gaps in conversation in a video file. In various embodiments, gaps in a video file can comprise a gap described in video runtime (e.g., from 1 hour, 30 minutes, 30 seconds in a video file to 1 hour, 33 minutes, 20 seconds in a video file). In the same or different embodiments, gaps in a video file can comprise a gap described in frame numbers (e.g., from frame 100 to frame 150). In some embodiments, activity 404 can comprise using a distributed network comprising distributed memory architecture to analyze a subtitle file to identify gaps in conversation in a video file. This distributed architecture can reduce the impact on the network and system resources to reduce congestion in bottlenecks while still allowing data to be accessible from a central location. In various embodiments, activity 404 can further comprise a portion or all of method 800 (FIG. 8).

Figure 8:
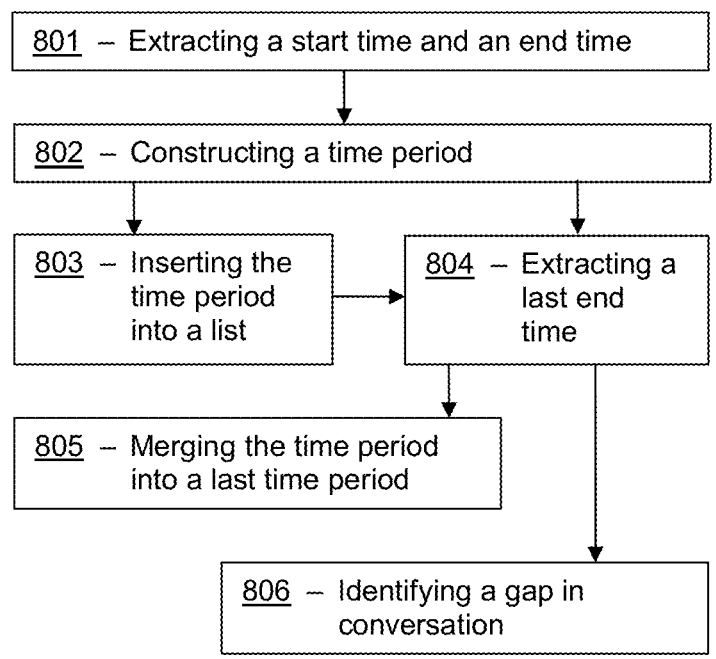
FIG. 8 illustrates a flowchart for a method, according to certain embodiments.

Turning ahead in the drawings, FIG. 8 illustrates a flow chart for a method 800, according to an embodiment. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped. As stated above, in some embodiments, a portion or all of method 800 can be performed as a part of activity 404. In various embodiments, all or a portion of method 800 can be performed completely separate from activity 404. In many embodiments, system 300 (FIG. 3) can be suitable to perform method 800 and/or one or more of the activities of method 800. In these or other embodiments, one or more of the activities of method 800 can be implemented as one or more computer instructions configured to run at one or more processing modules and configured to be stored at one or more non-transitory memory storage modules. Such non-transitory memory storage modules can be part of a computer system such as servers 310, 311 and/or user devices 320, 321 (FIG. 3). The processing module(s) can be similar or identical to the processing module(s) described above with respect to computer system 100 (FIG. 1).

In many embodiments, method 800 can comprise activity 801 of extracting a start time and an end time from a subtitle file for a specific subtitle. In various embodiments, a start time and/or an end time can comprise a time described in video runtime (e.g., 1 hour, 30 minutes, 30 seconds). In the same or different embodiments, a start time and/or an end time can comprise a time described in frame numbers (e.g., frame 100). In many embodiments, extraction can be accomplished by scanning and/or reading a subtitle file, and identifying start flags and end flags in the subtitle file. For example, in a MicroDVD file, basic subtitles have the syntax of: {start-frame} {stop-frame} Text. Therefore, a subtitle coded as {0} {25} Hello! would display "Hello!" beginning at frame zero and ending at frame 25. In this first example embodiment, a start flag would comprise a first set of curly brackets and an end flag would comprise a second set of curly brackets. As another example, in a Timed Text Markup Language (TTML) file, a subtitle coded as <p begin="00: 02:05.475" end="00:02:06.476" region="pop1" style="basic" tts:origin="27.50% 83.00%">LEWIS ON RADIO: </p> would display "LOUIS ON THE RADIO:" beginning at 2 minutes 5.475 seconds and ending at 2 minutes 6.476 seconds. In this second example embodiment, a start flag would comprise "begin=" and an end flag would comprise "end=". In some embodiments, once a start flag and end flag has been identified, respective start time and end time associated with it can be identified and extracted. In some embodiments, activity 801 can comprise using a distributed network comprising distributed memory architecture to extract a start time and end time from a subtitle file for a specific subtitle. This distributed architecture can reduce the impact on the network and system resources to reduce congestion in bottlenecks while still allowing data to be accessible from a central location.

In many embodiments, method 800 can comprise activity 802 of constructing a time period for a specific subtitle. In various embodiments, a start time and/or an end time for a specific subtitle can be used to construct a time period for a specific subtitle. In the same or different embodiments, a time period for a specific subtitle can comprise an amount of time spanning between a start time for the specific subtitle and an end time for the specific subtitle. In many embodiments, a time period for a specific subtitle can be constructed by setting a start time for a specific subtitle as a beginning of the time period for the specific subtitle and by setting an end time for a specific subtitle and an ending of the time period for the specific subtitle. In some embodiments, activity 802 can comprise using a distributed network comprising distributed memory architecture to construct a time period for a specific subtitle. This distributed architecture can reduce the impact on the network and system resources to reduce congestion in bottlenecks while still allowing data to be accessible from a central location.

In many embodiments, method 800 can comprise activity 803 of inserting a time period into a list. In some embodiments, a time period can be inserted into a list using a same format and/or syntax as a subtitle in a subtitle file. In the same or different embodiments, superfluous portions of a subtitle file can be discarded to reduce a processing burden and/or save storage capacity on a computer system. In various embodiments, a time period can be inserted into a list as only a start time and an end time. In many embodiments, a list can comprise a database of time periods. In various embodiments, a time period can be inserted into a list when the list is empty in order to start the list. In the same or different embodiments, a time period can be inserted into a list after a gap in conversation is identified (e.g., after activity 806), as described below. In some embodiments, activity 803 can comprise using a distributed network comprising distributed memory architecture to insert a time period into a list. This distributed architecture can reduce the impact on the network and system resources to reduce congestion in bottlenecks while still allowing data to be accessible from a central location.

In many embodiments, method 800 can comprise activity 804 of extracting a last end time. In various embodiments, a last end time can comprise an end time for a specific subtitle. In the same or different embodiments, a last end time can comprise an end time for multiple subtitles that have been merged together into a single time period. In some embodiments, an end time can be extracted in a same format and/or syntax as a subtitle in a subtitle file. In the same or different embodiments, superfluous portions of a subtitle file can be discarded when extracting a last end time to reduce a processing burden and/or save storage capacity on a computer system. In various embodiments, a last end time can be extracted as only a time value. In some embodiments, activity 804 can comprise using a distributed network comprising distributed memory architecture to extract a last end time. This distributed architecture can reduce the impact on the network and system resources to reduce congestion in bottlenecks while still allowing data to be accessible from a central location.

In many embodiments, method 800 can comprise activity 805 of merging the time period into a last time period. In some embodiments, a last end time can be compared to a start time of a specific subtitle, and, when the start time of the specific subtitle is determined to be within a predefined amount of time, a time period for the specific subtitle can be merged with another time period. In the same or different embodiments, when a time period for a specific subtitle is merged with another time period, an end time of the another time period can be updated to comprise an end time for the specific subtitle. In various embodiments, a start time of a subtitle can be within a predefined amount of time when a gap time between the start time of the subtitle and a last end time is less than the predefined amount of time. In the same or different embodiments, a gap time can be identified by taking a start time of a specific subtitle and subtracting a last end time. In the same or different embodiments, a predefined amount of time can be set by an administrator. As examples, the predefined amount of time can be at least 1 second, 5 seconds, 10 seconds, or 15 seconds. In the same or different embodiments, the gap time can be 1.5 seconds, 2.5 seconds, or 3 seconds. In this way, activity 805 can ensure that small gaps in conversation in a video file occurring in a same scene will not trigger the system and/or method to identify a scene change. In some embodiments, activity 805 can comprise using a distributed network comprising distributed memory architecture to merge a time period into a last time period. This distributed architecture can reduce the impact on the network and system resources to reduce congestion in bottlenecks while still allowing data to be accessible from a central location.

In many embodiments, method 800 can comprise activity 806 of identifying a gap in conversation. In various embodiments, a last end time can be compared to a start time of a specific subtitle, and, when the start time of the specific subtitle is determined to be outside of the predefined amount of time, a gap in conversation between the time period for the specific subtitle and the last time period can be identified. In some embodiments, a start time of a subtitle can be outside of the predefined amount of time when the gap time between the start time of the subtitle and a last end time is greater than the predefined amount of time. In the same or different embodiments, the gap time can be identified by taking a start time of a specific subtitle and subtracting a last end time. In the same or different embodiments, the predefined amount of time can be set by an administrator. In some embodiments, activity 806 can comprise using a distributed network comprising distributed memory architecture to identify a g. This distributed architecture can reduce the impact on the network and system resources to reduce congestion in bottlenecks while still allowing data to be accessible from a central location.

Returning now to FIG. 4, in many embodiments, method 400 can comprise activity 405 of identifying a scene change in a video file. In some embodiments, a scene change can be identified when a level of difference between at least two consecutive frames of a video file is above a predefined threshold. In various embodiments, a level of difference between at least two consecutive frames of a video file can be identified using the same techniques as described for activity 402. In the same or different embodiments, a scene change can be identified when it is determined that there is a gap in conversation. In many embodiments, a scene change is identified when a level of difference between at least two consecutive frames of a video file is above a predefined threshold during a gap in conversation. In many embodiments, a predefined threshold can be set by an administrator or can be set to a standard deviation as described in activity 402. In some embodiments, activity 405 can comprise using a distributed network comprising distributed memory architecture to identify a scene change in a video file. This distributed architecture can reduce the impact on the network and system resources to reduce congestion in bottlenecks while still allowing data to be accessible from a central location.

In many embodiments, method 400 can further comprise activity 406 of inserting a media file when a scene change occurs. In some embodiments, a media file can be inserted into a video file when a scene change occurs. In various embodiments, a media file can be embedded in, spliced into, and/or appended to a video file in such a way that the media file and the video file become one file, and the media file is displayed and/or played during a scene change as identified above. In the same or different embodiments, a video file is paused at a scene change, and a media file is displayed over, played on top of, overlaid over, and/or displayed instead of the video file. In some embodiments, a video file resumes playback after a media file has finished playing and/or being displayed. In various embodiments, a video continues to play behind and/or in a background of a media file when the media file is displayed and/or played. In the same or different embodiments, a media file can comprise a video file, an audio file, an image file, and/or an advertisement. In some embodiments, activity 406 can comprise using a distributed network comprising distributed memory architecture to insert a media file when a scene change occurs. This distributed architecture can reduce the impact on the network and system resources to reduce congestion in bottlenecks while still allowing data to be accessible from a central location.

In some embodiments, activity 406 can further comprise identifying a minimum time between two media files, and, when a second scene change occurs within a minimum time between the two media files, not inserting the media file into the video file at the scene change. In the same or different embodiments, a minimum time between two media files can be set by an administrator. In various embodiments, a minimum time between two media files can comprise 1 minute, 2 minutes, 2 minutes 30 seconds, 3 minutes, 3 minutes 15 seconds, 4 minutes, etc. In this way, the system and/or method can be prevented from interrupting the video file too often with media files. In various embodiments, a scene change can be detected during an end credit sequence of a video file, and when this occurs, a media file is not inserted into the video file at the scene change.

Figure 5:
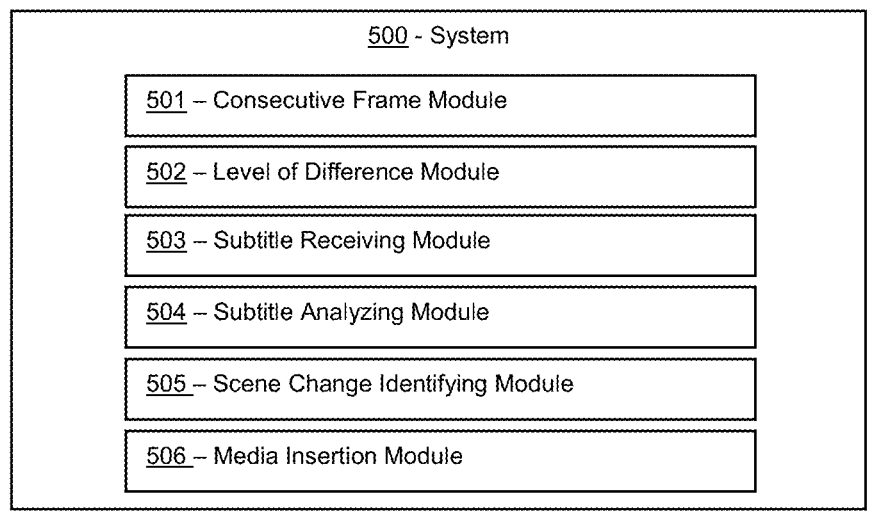
FIG. 5 illustrates a representative block diagram of a system of FIG. 3, according to an embodiment.

Turning ahead in the drawings, FIG. 5 illustrates a block diagram of a system 500 that can be employed to determine a scene change in a video file. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise module 501. Module 501 can be referred to as consecutive frame module 501. In many embodiments, consecutive frame module 501 can store computing instructions configured to run on one or more processing modules and perform one or more acts of method 400 (FIG. 4) (e.g., activity 401 of receiving at least two consecutive frames of a video file (FIG. 4)).

In many embodiments, system 500 can comprise module 502. Module 502 can be referred to as level of difference module 502. In many embodiments, level of difference module 502 can store computing instructions configured to run on one or more processing modules and perform one or more acts of method 400 (FIG. 4) (e.g., activity 402 of determining a level of difference between at least two consecutive frames of a video file (FIG. 4)).

In many embodiments, system 500 can comprise module 503. Module 503 can be referred to as subtitle receiving module 503. In many embodiments, subtitle receiving module 503 can store computing instructions configured to run on one or more processing modules and perform one or more acts of method 400 (FIG. 4) (e.g., activity 403 of receiving a subtitle file associated with a video file (FIG. 4)).

In many embodiments, system 500 can comprise module 504. Module 504 can be referred to as subtitle analyzing module 504. In many embodiments, subtitle analyzing module 504 can store computing instructions configured to run on one or more processing modules and perform one or more acts of method 400 (FIG. 4) (e.g., activity 404 of analyzing a subtitle file to identify gaps in conversation in a video file (FIG. 4)).

In many embodiments, system 500 can comprise module 505. Module 505 can be referred to as scene change identifying module 505. In many embodiments, scene change identifying module 505 can store computing instructions configured to run on one or more processing modules and perform one or more acts of method 400 (FIG. 4) (e.g., activity 505 of identifying a scene change in a video file (FIG. 4)).

In many embodiments, system 500 can comprise module 506. Module 506 can be referred to as media insertion module 506. In many embodiments, media insertion module 506 can store computing instructions configured to run on one or more processing modules and perform one or more acts of method 400 (FIG. 4) (e.g., activity 505 of inserting a media file when a scene change occurs (FIG. 4)).

Figure 7:
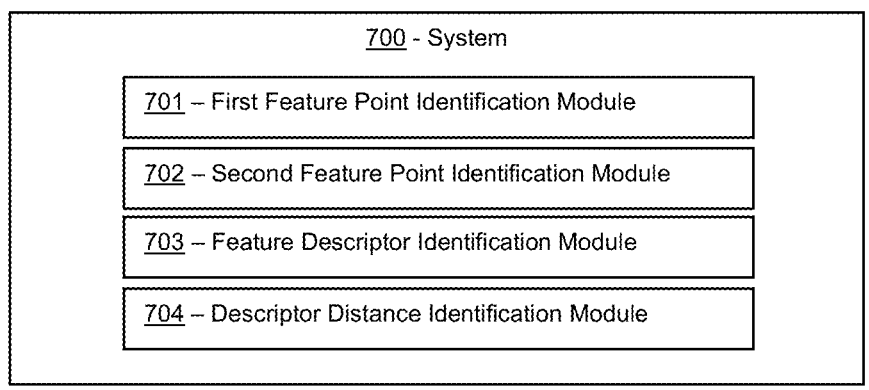
FIG. 7 illustrates a representative block diagram of a system, according to an embodiment.

Turning ahead in the drawings, FIG. 7 illustrates a block diagram of a system 700 that can be employed to determine a scene change in a video file. System 700 is merely exemplary and embodiments of the system are not limited to the embodiments presented herein. System 700 can be employed in many different embodiments or examples not specifically depicted or described herein. In some embodiments, certain elements or modules of system 700 can perform various procedures, processes, and/or activities. In these or other embodiments, the procedures, processes, and/or activities can be performed by other suitable elements or modules of system 700.

Generally, therefore, system 700 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 described herein.

In many embodiments, system 700 can comprise module 701. Module 701 can be referred to as first feature point identification module 701. In many embodiments, first feature point identification module 701 can store computing instructions configured to run on one or more processing modules and perform one or more acts of method 600 (FIG. 6) (e.g., activity 601 of identifying a first set of feature points (FIG. 6)).

In many embodiments, system 700 can comprise module 702. Module 702 can be referred to as second feature point identification module 702. In many embodiments, second feature point identification module 702 can store computing instructions configured to run on one or more processing modules and perform one or more acts of method 600 (FIG. 6) (e.g., activity 602 of identifying a second set of feature points (FIG. 6)).

In many embodiments, system 700 can comprise module 703. Module 703 can be referred to as feature descriptor identification module 703. In many embodiments, feature descriptor identification module 703 can store computing instructions configured to run on one or more processing modules and perform one or more acts of method 600 (FIG. 6) (e.g., activity 603 of identifying a feature descriptor for each feature point in a set of feature points (FIG. 6)).

In many embodiments, system 700 can comprise module 704. Module 704 can be referred to as descriptor distance identification module 704. In many embodiments, descriptor distance identification module 704 can store computing instructions configured to run on one or more processing modules and perform one or more acts of method 600 (FIG. 6) (e.g., activity 604 of calculating a descriptor distance for at least a pair of feature points (FIG. 6)).

Figure 9:
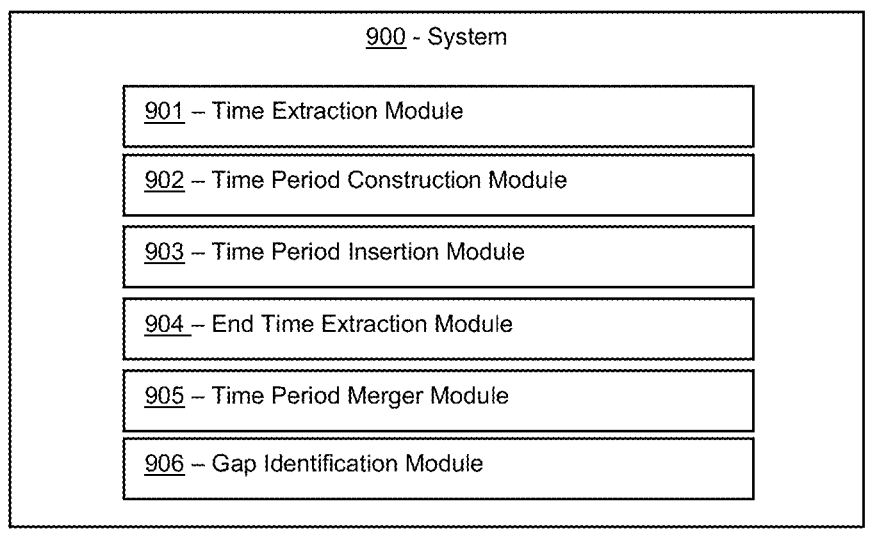
FIG. 9 illustrates a representative block diagram of a system, according to an embodiment.

Turning ahead in the drawings, FIG. 9 illustrates a block diagram of a system 900 that can be employed to identify scene changes in a video file. System 900 is merely exemplary and embodiments of the system are not limited to the embodiments presented herein. System 900 can be employed in many different embodiments or examples not specifically depicted or described herein. In some embodiments, certain elements or modules of system 900 can perform various procedures, processes, and/or activities. In these or other embodiments, the procedures, processes, and/or activities can be performed by other suitable elements or modules of system 900.

Generally, therefore, system 900 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 900 described herein.

In many embodiments, system 900 can comprise module 901. Module 901 can be referred to as time extraction module 901. In many embodiments, time extraction module 901 can store computing instructions configured to run on one or more processing modules and perform one or more acts of method 800 (FIG. 8) (e.g., activity 801 of extracting a start time and an end time from a subtitle file for a specific subtitle (FIG. 8)).

In many embodiments, system 900 can comprise module 902. Module 902 can be referred to as time period construction module 902. In many embodiments, time period construction module 902 can store computing instructions configured to run on one or more processing modules and perform one or more acts of method 800 (FIG. 8) (e.g., activity 802 of constructing a time period for a specific subtitle (FIG. 8)).

In many embodiments, system 900 can comprise module 903. Module 903 can be referred to as time period insertion module 903. In many embodiments, time period insertion module 903 can store computing instructions configured to run on one or more processing modules and perform one or more acts of method 800 (FIG. 8) (e.g., activity 803 of inserting a time period into a list (FIG. 8)).

In many embodiments, system 900 can comprise module 904. Module 904 can be referred to as end time extraction module 904. In many embodiments, end time extraction module 904 can store computing instructions configured to run on one or more processing modules and perform one or more acts of method 800 (FIG. 8) (e.g., activity 804 of extracting a last end time (FIG. 8)).

In many embodiments, system 900 can comprise module 905. Module 905 can be referred to as time period merger module 905. In many embodiments, time period merger module 905 can store computing instructions configured to run on one or more processing modules and perform one or more acts of method 800 (FIG. 8) (e.g., activity 905 of merging a time period into a last time period (FIG. 8)).

In many embodiments, system 900 can comprise module 906. Module 906 can be referred to as gap identification module 906. In many embodiments, gap identification module 906 can store computing instructions configured to run on one or more processing modules and perform one or more acts of method 800 (FIG. 8) (e.g., activity 806 of identifying a gap in conversation (FIG. 8)).

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
receiving at least two consecutive frames of a video file;
determining a level of difference between the at least two consecutive frames of the video file;
receiving a subtitle file associated with the video file;
analyzing the subtitle file to identify a gap in conversation in the video file; and
identifying a scene change in the video file when:
the level of difference between the at least two consecutive frames of the video file breaches a predefined similarity threshold during an identified gap in conversation; and
otherwise, refrain from identifying a scene change in the video file when: the level of difference between the at least two consecutive frames of the video file breaches the predefined similarity threshold outside of an identified gap in the conversation;
wherein a media file is inserted into the video file when the scene change occurs.

2. The system of claim 1, wherein the computing instructions are further configured to perform:
identifying a minimum time between two media files; and
when a second scene change occurs within the minimum time after the media file, not displaying a second media file when the second scene change occurs.

3. The system of claim 1, wherein when the scene change occurs during an end credit sequence, the media file is not inserted into the video file at the scene change.

4. The system of claim 1, wherein:
the step of determining the level of difference between the at least two consecutive frames of the video file is performed on a standard definition version of the video file; and
the media file is inserted into a high definition version of the video file.

5. The system of claim 1, wherein determining the level of difference between the at least two consecutive frames of the video file occurs only for frames of the video file that are associated with portions of the video file corresponding to the gap in the conversation in the video file.

6. A method being implemented via execution of computing instructions configured to run at one or more processors and configured to be stored at non-transitory computer-readable media, the method comprising:
receiving at least two consecutive frames of a video file;
determining a level of difference between the at least two consecutive frames of the video file;
receiving a subtitle file associated with the video file;
analyzing the subtitle file to identify a gap in conversation in the video file; and
identifying a scene change in the video file when:
the level of difference between the at least two consecutive frames of the video file breaches a predefined similarity threshold during an identified gap in conversation; and
otherwise, refrain from identifying a scene change in the video file when:
the level of difference between the at least two consecutive frames of the video file breaches the predefined similarity threshold outside of the identified gap in the conversation;
wherein a media file is inserted into the video file when the scene change occurs.

7. The method of claim 6 further comprising:
identifying a minimum time between two media files; and
when a second scene change occurs within the minimum time after the media file, not displaying a second media file when the second scene change occurs.

8. The method of claim 6, wherein when the scene change occurs during an end credit sequence, the media file is not inserted into the video file at the scene change.

9. The method of claim 6, wherein:
the step of determining the level of difference between the at least two consecutive frames of the video file is performed on a standard definition version of the video file; and
the media file is inserted into a high definition version of the video file.

10. The method of claim 6, wherein determining the level of difference between the at least two consecutive frames of the video file occurs only for frames of the video file that are associated with portions of the video file corresponding to the gap in the conversation in the video file.

11. A tangible, non-transitory, computer-readable medium, comprising computer-readable instructions that, when executed by one or more processors of one or more computers, cause the one or more computers to:
receive at least two consecutive frames of a video file;
determine a level of difference between the at least two consecutive frames of the video file;
receive a subtitle file associated with the video file;
analyze the subtitle file to identify a gap in conversation in the video file; and
identify a scene change in the video file when:
the level of difference between the at least two consecutive frames of the video file breaches a predefined similarity threshold during an identified gap in conversation; and
otherwise, refrain from identifying a scene change in the video file when: the level of difference between the at least two consecutive frames of the video file breaches the predefined similarity threshold outside of an identified gap in the conversation;
wherein a media file is inserted into the video file when the scene change occurs.

12. The tangible, non-transitory, computer-readable medium of claim 11, comprising computer-readable instructions that, when executed by the one or more processors of the one or more computers, cause the one or more computers to:
identify a minimum time between two media files; and
when a second scene change occurs within the minimum time after the media file, not display a second media file when the second scene change occurs.

13. The tangible, non-transitory, computer-readable medium of claim 11, wherein when the scene change occurs during an end credit sequence, the media file is not inserted into the video file at the scene change.

14. The tangible, non-transitory, computer-readable medium of claim 11, wherein:
the step of determining the level of difference between the at least two consecutive frames of the video file is performed on a standard definition version of the video file; and
the media file is inserted into a high definition version of the video file.

15. The tangible, non-transitory, computer-readable medium of claim 11, wherein determining the level of difference between the at least two consecutive frames of the video file occurs only for frames of the video file that are associated with portions of the video file corresponding to the gap in the conversation in the video file.

* * * * *